United States Patent [19]

Anson et al.

[11] Patent Number: 4,920,871
[45] Date of Patent: May 1, 1990

[54] BEVERAGE MAKING APPLIANCE

[75] Inventors: James H. Anson, Auburn; James L. Kates, Rochester; Alan W. Brewer, Divernon; Brent R. Friedrich, Springfield, all of Ill.

[73] Assignee: Bunn-O-Matic Corporation, Springfield, Ill.

[21] Appl. No.: 360,134

[22] Filed: Jun. 1, 1989

[51] Int. Cl.$^5$ .............................................. A47J 31/00
[52] U.S. Cl. ........................................ 99/295; 99/304
[58] Field of Search ................. 99/295, 300, 304, 306, 99/282, 279, 284; 426/433

[56] References Cited

U.S. PATENT DOCUMENTS

| | | | |
|---|---|---|---|
| 2,603,620 | 8/1986 | Daugherty | 99/284 |
| 3,793,934 | 2/1974 | Martin | 99/282 |
| 4,448,113 | 5/1984 | Brabon | 99/304 |
| 4,457,217 | 7/1984 | Ogawa | 99/295 |
| 4,809,594 | 3/1989 | Vitous | 99/295 |

*Primary Examiner*—Robert W. Jenkins
*Attorney, Agent, or Firm*—Richard Bushnell

[57] * ABSTRACT

A beverage (tea and coffee) making appliance of the type having a reservoir wherein a supply of hot water for brewing is maintained and from which a volume of the hot water is displaced by an equal volume of a batch of cold water discharged by gravity from a cold water basin through a fill tube into the bottom of the reservoir. The displaced hot water is discharged into a brewing funnel lined with a filter on which the beverage forming material (ground coffee or tea leaves) is placed. The cold water basin is equipped with a removable standpipe-like fitting on the upper end of the fill tube through which cold water enters as long as the level of water in the cold water basin is above the upper end or entrance opening in the fill tube. The fill basin has a second drain opening to which is connected one end of a tube the other end of which discharges into a portion of the brewing funnel which is partitioned off from the filter lined portion. In making iced tea, the portion of hot water flowing into the brewing funnel forms a concentrate which on discharging from the brewing funnel combines with the cold water entering the partitioned-off portion of the brewing funnel thereby forming iced tea stock. When the standpipe is removed and the second drain opening is closed the applicance can be used to brew coffee or tea in conventional manner.

7 Claims, 1 Drawing Sheet

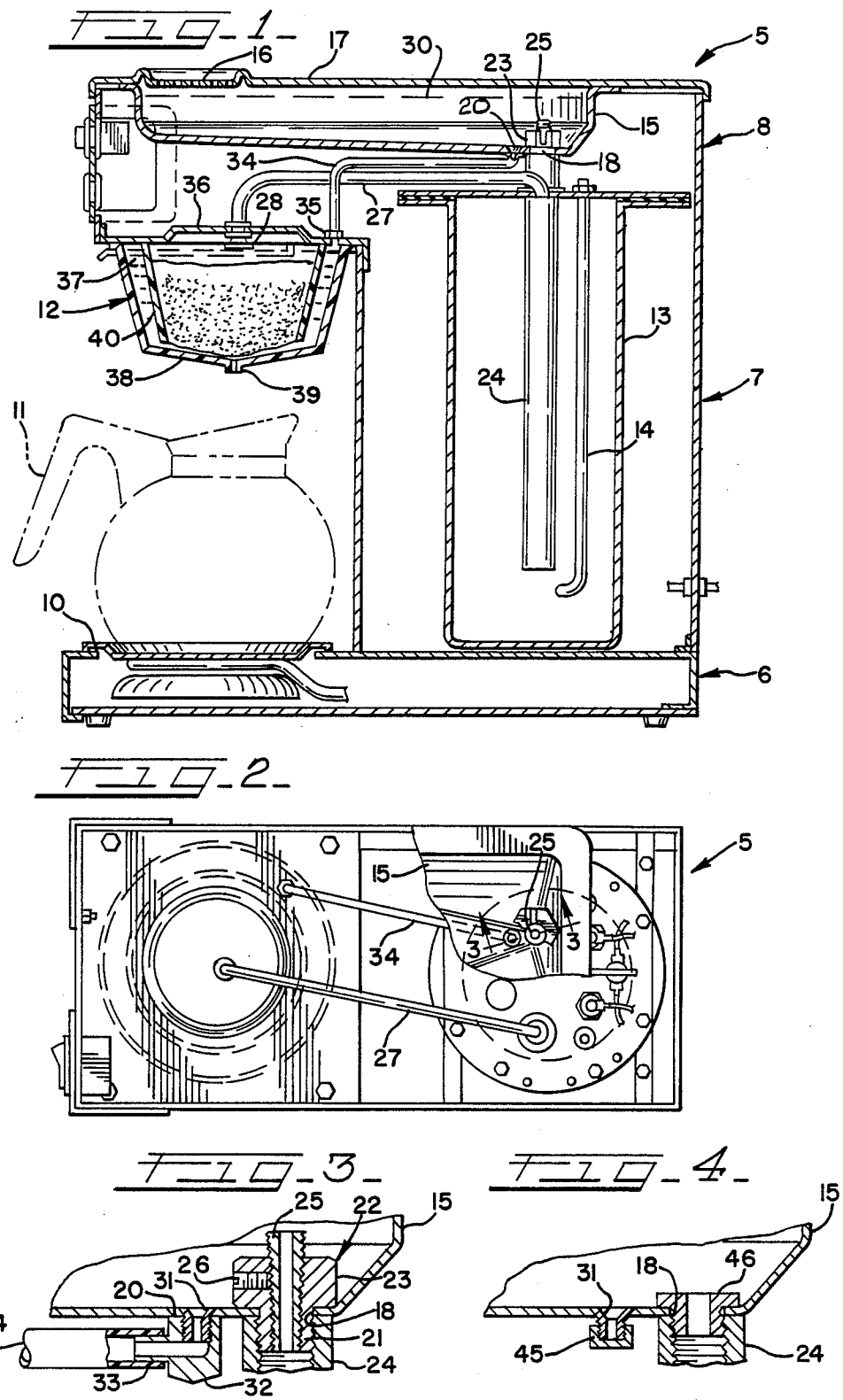

BEVERAGE MAKING APPLIANCE

This invention relates, generally, to beverage making appliances of the known type having a reservoir wherein a supply of hot water for brewing is maintained and from which a volume of the hot water is displaced by a batch of cold water of equal volume discharging by gravity from a cold water basin through a fill tube into the bottom of the reservoir. This known type of beverage making appliance has been conventionally used to brew coffee, and to a lesser extent tea, ready for consumption. According to the present invention, this known type of beverage making appliance has been modified in such a way that it is suited to produce iced tea stock ready for consumption after the addition of ice. The apparatus of the present invention can be readily converted to a condition in which it may be used in the conventional manner to brew coffee or reduced volumes of ready-to-consume hot brewed tea.

According to the present invention, known types of beverage making machines or appliances having cold water basins mounted above hot water reservoirs and in normal operation having a batch of cold water drained from the basin into the bottom of the reservoir to displace an equal amount of hot water which discharges into a brewing funnel are modified so that the normal mode of operating is maintained only to a partial extent and an additional operating function is added. In the additional function, a portion of the cold water batch introduced into the cold water basin is diverted directly into a partitioned off section of the brewing funnel so that it does not enter the portion of the brewing funnel in which the brewing action takes place. The diverted stream of cold water blends with the brewed tea concentrate and the resulting blend discharges from the brewing funnel into the carafe or decanter in the form of iced tea stock ready for consumption on the addition of ice. Further, according to the present invention, a beverage making appliance modified so as to operate in the dual manner described can be readily changed or re-modified so as to operate in the conventional manner in which all of the cold water batch introduced into the basin discharges into the hot water reservoir and the equal volume of hot water that is displaced is all introduced into the brewing funnel and enters into the brewing operation.

The object of the invention, generally stated, is the provision of an improved appliance or machine for making iced tea stock which takes the form of a coffee making appliance of the known type wherein a batch of cold water introduced into a cold water basin discharges by gravity into the bottom of a hot water tank or reservoir and displaces an equal volume of hot water into a brewing funnel and this known type of equipment is altered or modified so that a portion of the batch of cold water introduced into the basin displaces an equal portion or volume of hot water from the hot water reservoir into the brewing chamber of a brewing funnel so as to brew or steep a tea concentrate therein while another portion of the batch of cold water is diverted into a portion of the brewing funnel which is partitioned off from the brewing chamber with the diverted water and tea concentrate discharging as a blend from the brewing funnel in the form of iced tea stock ready for consumption on the addition of ice thereto.

An important object of the present invention is the provision of a beverage making appliance capable of a dual or blending type operation to form iced tea stock which can be readily modified or altered so as to operate conventionally with the entire batch of cold water introduced into the cold water basin of the appliance displacing an equal volume of hot water from the hot water supply tank to the brewing funnel in which it is utilized to brew coffee or tea.

Certain other important objects of the invention will be and become obvious to those skilled in the art from the following detailed description of the invention taken in connection with the accompanying drawings, wherein:

FIG. 1 is a longitudinal vertical sectional view through a beverage making appliance forming one embodiment of the invention certain known parts being omitted for clarity;

FIG. 2 is a top plan view, partly broken away, of the appliance shown in FIG. 1 after the top cover has been removed;

FIG. 3 is a fragmentary sectional view on enlarged scale taken on line 3—3 of FIG. 2; and FIG. 4 is a fragmentary detail view on enlarged scale corresponding to FIG. 3 but showing the apparatus modified or altered so as to operate in a conventional beverage making manner.

In FIGS. 1 and 2, a beverage making appliance is indicated generally at 5 which is particularly useful in producing stock for iced tea. In its overall construction, the unit 5 corresponds to and incorporates a number of features which are common to known prior art beverage (i.e. coffee and tea) making machines of the type which incorporate a hot water reservoir in which a supply of hot water is maintained and from the top of which volumes of hot water are displaced by equal volumes of cold water introduced into the lower portion of the reservoir by gravity from a cold water basin mounted above the reservoir. The displaced hot water is discharged from a spray head onto a deposit of ground coffee or tea leaves in a filter-lined brewing funnel from which the brewed beverage drains into a carafe or decanter supported on a warming plate. This general type of beverage making appliance or machine is disclosed, for example, in the following patents:

| Martin | 3,385,201 | 5-28-68 |
| Martin | 3,494,276 | 2-10-70 |
| Martin | 3,736,155 | 5-29-73 |
| Martin | 3,793,934 | 2-26-74 |
| Martin | 4,094,233 | 6-13-78 |
| Daugherty | 4,476,775 | 10-16-74 |
| Zimmerman | 4,503,757 | 3-12-85 |
| Stover | 4,531,046 | 7-23-85 |
| Daugherty | 4,603,620 | 8-5-86 |
| Foley | 4,676,148 | 6-30-87 |

The particular unit shown in FIGS. 1 and 2, except for the differences to be described, corresponds to the beverage making apparatus shown in FIGS. 1 and 2 of application Ser. No. 309,476, now U.S. Pat. No. 4,867,048, of Alan W. Brewer filed Feb. 13, 1989 and assigned to the assignee of the present invention and application, the disclosure of which is incorporated by reference herein. However, it will be understood that the particular construction shown in FIGS. 1 and 2 could have been patterned after and correspond in general construction to the cold water basin type beverage making machines shown in any of the above-mentioned patents.

Referring to FIGS. 1 and 2, the unit 5 comprises a base indicated generally at 6, a trunk indicated generally at 7, and a superstructure indicated generally at 8. The base 6 supports a circular warmer plate 10 on which a beverage decanter or carafe rests which is indicated in phantom at 11. The front portion of the superstructure 8 overhangs the warmer plate 10 and a brewing funnel indicated at 12 is removably supported underneath the overhanging portion of the superstructure 8.

A hot water tank or reservoir 13 is mounted within the trunk 7 and the water contents thereof are heated by an electrical heater of known type 14. Mounted in the superstructure 8 above the reservoir 13 is a cold water basin 15. Batches of cold water are introduced into the basin 15 through the screened opening 16 in the coverplate 17. In a number of the above-mentioned patents, batches of cold water are introduced from a source under pressure.

Whereas conventionally the cold water basin 15 would be provided with only one drain opening located at 18 (FIGS. 1 and 3), in unit 5 there is an additional drain opening located at 20. The externally and internally threaded nipple portion 21 (FIG. 3) of a fitting 22 which includes a hex nut portion 23 extends downwardly through the opening 18. The internally threaded upper end of a cold water fill tube 24 is screwed onto the exteriorly threaded nipple 21. An exteriorly threaded tubular fitting 25 is screwed into the fitting 22 and is secured or locked in any particular height-adjusted position therein by means of a set screw 26. The fitting 25 becomes a vertical extension of the fill tube 24.

The fill tube 24 extends downwardly into the bottom portion of the reservoir 13 so that cold water from the basin 15 discharges into the lower portion of the reservoir 13 and displaces in equal volume of hot water from the upper portion of the reservoir 13. The displaced hot water flows through a siphon tube 27 and discharges from a spray head 28 into the brewing funnel 12.

It will be seen that when a batch of cold water introduced into the basin 15 is of sufficient quantity to have a level as indicated at 30 which is above the upper end of the vertically adjustable tube 25, there will be two routes by which cold water discharges by gravity from the basin 15. One route is through the tubular fitting or tube 25, thence downwardly through the cold water fill tube 24. The other route is outwardly through the drain opening 20 which is provided with a flared tubular fitting 31, the exteriorly threaded stem portion of which projects downwardly through the opening 20 and receives a nut fitting 32 having on the side an integrally formed nipple 33. A flexible tube 34 fits over the nipple 33 at one of its ends and its other end connects with a fitting 35 secured in the floor plate 36 on the underside of the overhanging portion of the superstructure 8.

The brewing funnel 12 has a frusto-conical outer body 37 with a convex or dished bottom 38 at the center and low point of which is a drain opening 39. The central brewing portion of the funnel 12 is partitioned off from the outer shell by means of a frusto-conical baffle 40 which is open at its lower end and spaced from the dished bottom 38.

The operation of the unit 5 in the production of iced tea stock is as follows: Assuming that the hot water in the reservoir 13 is at its thermostatically controlled temperature and that a paper filter has been inserted on the inner compartment 40 of the brewing funnel 12 and the desired amount of tea leaves have been placed on the filter, a batch of cold water is introduced into the basin 15 by pouring the same through the opening 16. Immediately some of the water begins to flow down through the standpipe tubular fitting 25 into the cold water fill tube 24 while another stream of cold water begins to flow out through the opening 20 and through the tubular connection 34 so as discharge into the partitioned off portion of the brewing funnel 12 defined between the outer wall 36 and the baffle 40. Once enough of the hot water has been displaced from the top of the reservoir 13 out through the hot water tube 27 to the spray head 28 the tea leaves will be covered with hot water and the brewing action will begin to take place. During this brewing action, brewed tea concentrate will discharge from the inner brewing compartment and blend with the cold water discharging from the partitioned off space and the two streams will combine and discharge through the funnel opening 39 into the carafe 11.

Cold water will continue to discharge through the fill tube 24 by way of the tubular fitting 25 until the level 30 of the water in the basin reaches the level of the upper end of the tubular member 25 whereupon the flow of cold water into the reservoir 13 will stop. Cold water will continue to drain through the opening 20 until all of the water has been drained from the basin 15. When the discharge from the brewing funnel has stopped, the contents of the carafe 11 will be ready for use as stock for making iced tea and will be a blend of the brewed tea concentrate from the inner compartment of the funnel 12 and the cold water diverted from the basin 12 through the opening 20. By appropriately adjusting the height of the tube 25 and dimensioning the size of the opening therein and of the opening through the fitting 31, the rate of flow through the hot water tube 27 and the tube 34 can be suitably controlled so that the flow of diluting water through the conduit or tube 34 will stop at approximately the same time that the flow of tea concentrate from the inner brewing funnel stops.

A degree of fine adjustment as to the proportion between the cold water used or consumed in brewing and the diluting water can be obtained by raising or lowering the fitting 25 and retightening the set screw 26.

It will be seen that the volume of water in the basin 15 which is available for discharging through the tubular fitting 25 is directly proportional to the horizontal area of the water in the basin times the depth of the upper end of the fitting 25. Since this horizontal area is essentially constant and the discharge head does not materially change, the rate of discharge through the fitting 25 will be relatively constant.

If for some reason it is no longer desired to use the unit 5 for producing stock for iced tea, the unit can be readily converted or adapted for brewing hot coffee or tea in the conventional manner. Thus, referring to FIGS. 3 and 4, the nut 32 is removed from the fitting 31 and the stem end thereof is closed by screwing on a cap 45. The fitting 22 is removed and replaced by a conventional nut fitting 46. In addition, the brewing funnel 12 will be replaced with a conventional brewing funnel which does not have a partitioned off brewing chamber. The thus converted unit can now be operated in the normal or conventional manner to brew coffee or hot tea.

If desired, the beverage machine 5 may be plumbed to a source of cold water under pressure as disclosed in the above-mentioned co-pending application Ser. No.

309,476. When so modified and plumbed, the machine can be operated either as a so-called "automatic" unit or as a so-called pour-over unit. However, the above-described operation of the beverage machine will not change whether the batch of cold water is poured into basin 15 manually or introduced automatically therein.

What is claimed is:

1. In beverage brewing apparatus comprising, in combination, a cold water basin having a first drain opening and a fill opening through which a batch of cold water may be poured or dumped, a hot water tank under said basin, means for heating water in said tank, a cold water tube having its upper inlet end connected to said first drain opening and having its lower outlet end disposed in the lower portion of said hot water tank whereby cold water in said basin drains by gravity into the lower portion of said hot water tank, a hot water spray head, a siphon tube interconnecting said spray head with a hot water outlet in or adjacent the top of said hot water tank whereby hot water displaced by cold water entering the lower portion of said hot water tank flows through said siphon tube to said spray head through which it discharges, and means for supporting a brewing funnel beneath said spray head, the improvement comprising:

a brewing funnel on said brewing funnel support means comprising a hot water receiving compartment disposed beneath said spray head, a cold water receiving compartment exterior to said hot water receiving compartment, and a funnel bottom outlet opening in communication with both said compartments;

a tubular cold water inlet fitting mounted in said basin, and having an inlet opening located above said first drain opening and an outlet opening communicating with said upper inlet end of said cold water tube whereby said tubular cold water inlet fitting forms an upper extension of said cold water tube; and, said basin having a second drain opening and a cold water drain tube interconnecting said second drain opening with said cold water receiving compartment of said brewing funnel, whereby when said basin contains cold water at a level above said inlet opening in said cold water inlet tube, cold water drains simultaneously into said hot water tank and said cold water receiving compartment until said level drops below said inlet opening in said cold water inlet tube after which the remaining water in said basins drains through said second drain opening.

2. The improvement called for in claim 1, wherein said tubular cold water inlet fitting is vertically adjustable whereby the height of said inlet opening therein is vertically adjustable.

3. The improvement called for in claim 1, wherein said tubular cold water inlet fitting is removable and said second drain opening is closable.

4. The improvement called for in claim 1, wherein a fitting with a threaded bore has an exteriorly threaded nipple which protrudes downwardly through said first drain opening and is integral with a nut which rests on the upper side of said first drain opening, said upper inlet end of said cold water tube being threaded and screwed onto said exteriorly threaded nipple, and at least the lower end of said tubular cold water inlet fitting is threaded and screwed into said threaded bore.

5. The improvement called for in claim 1, wherein said second drain opening has a tubular fitting inserted therein which has an exteriorly threaded nipple protruding downwardly from the bottom of said basin, said threaded nipple providing alternatively a removable fluid-tight connection with said cold water drain tube and a removable fluid-tight connection with a removable closure cap.

6. The improvement called for in claim 1, wherein said hot water receiving compartment of said brewing funnel is provided by an inverted frusto-conical baffle centrally supported within said funnel and said cold water receiving compartment is provided by the annular space between the exterior of said frusto-conical baffle and the interior of said funnel.

7. In the beverage brewing apparatus of claim 1, a cold water inlet line connected with said basin for delivering cold water thereto from a pressurized cold water supply source, valve means in said cold water inlet line for opening and closing said line, and control means operatively associated with said valve means for allowing batches of cold water of predetermined size to be introduced into said basin.

* * * * *